(12) United States Patent
Jones et al.

(10) Patent No.: US 9,965,319 B2
(45) Date of Patent: May 8, 2018

(54) DYNAMIC TIME-BASED SEQUENCING

(71) Applicant: Pearson Education, Inc., New York, NY (US)

(72) Inventors: Robert Jones, Marshfield, MA (US); Russell LeWinter, Orlando, FL (US)

(73) Assignee: PEARSON EDUCATION, INC., New York, NY (US)

( * ) Notice: Subject to any disclaimer, the term of this patent is extended or adjusted under 35 U.S.C. 154(b) by 0 days. days.

(21) Appl. No.: 15/340,640

(22) Filed: Nov. 1, 2016

(65) Prior Publication Data

US 2017/0046194 A1   Feb. 16, 2017

Related U.S. Application Data

(63) Continuation of application No. 14/813,930, filed on Jul. 30, 2015, now Pat. No. 9,513,958, which is a continuation-in-part of application No. 14/170,253, filed on Jan. 31, 2014.

(51) Int. Cl.
| | |
|---|---|
| *G06F 9/46* | (2006.01) |
| *G06Q 10/10* | (2012.01) |
| *G06Q 50/20* | (2012.01) |
| *G06Q 10/06* | (2012.01) |

(52) U.S. Cl.
CPC .......... *G06F 9/46* (2013.01); *G06Q 10/0631* (2013.01); *G06Q 10/109* (2013.01); *G06Q 50/20* (2013.01)

(58) Field of Classification Search
CPC ....................................................... G06F 9/46
USPC .......................................................... 718/102
See application file for complete search history.

(56) References Cited

U.S. PATENT DOCUMENTS

| | | | | |
|---|---|---|---|---|
| 5,293,620 | A * | 3/1994 | Barabash | G06F 9/4881 718/102 |
| 5,864,869 | A | 1/1999 | Doak et al. | |
| 6,353,447 | B1 | 3/2002 | Truluck et al. | |
| 6,711,378 | B2 | 3/2004 | Kashima | |
| 7,165,252 | B1 * | 1/2007 | Xu | G06F 9/4887 718/100 |
| 7,330,822 | B1 | 2/2008 | Robson et al. | |
| 9,513,958 | B2 | 12/2016 | Jones et al. | |
| 2006/0088806 | A1 | 4/2006 | Quinn | |
| 2006/0288346 | A1 * | 12/2006 | Santos | G06F 9/4887 718/102 |
| 2013/0151300 | A1 | 6/2013 | Le Chevalier et al. | |
| 2014/0046717 | A1 | 2/2014 | Yuan et al. | |
| 2015/0221056 | A1 | 8/2015 | Jones et al. | |

OTHER PUBLICATIONS

Advisory Action Before the Filing of an Appeal Brief dated Dec. 22, 2015, for U.S. Appl. No. 14/170,253, 3 pages.

(Continued)

*Primary Examiner* — Ryan D. Coyer
(74) *Attorney, Agent, or Firm* — Kilpatrick Townsend & Stockton LLP

(57) ABSTRACT

In some embodiments, techniques include identifying a plurality of tasks associated with an identifier corresponding to an electronic device. A task series is generated so as to include the plurality of tasks, where each task in the series is associated with a performance time. When it is determined that the task has not been completed by the performance time, the task series is updated.

20 Claims, 8 Drawing Sheets

(56) References Cited

OTHER PUBLICATIONS

First Action Interview Pilot Program Pre-Interview Communication dated Mar. 20, 2014, for U.S. Appl. No. 14/170,253, 6 pages.
First Action Interview Office Action Summary dated Apr. 11, 2014, in U.S. Appl. No. 14/170,253, 7 pages.
Non-Final Office Action dated May 4, 2015, in U.S. Appl. No. 14/170,253, 12 pages.
Final Office Action dated Oct. 13, 2015, in U.S. Appl. No. 14/170,253, 18 pages.
First Action Interview Pilot Program Pre-Interview Communication dated Nov. 11, 2015, in U.S. Appl. No. 14/813,930, 4 pages.

* cited by examiner

DYNAMIC TIME-BASED SEQUENCING

CROSS-REFERENCE TO RELATED APPLICATIONS

This application is a continuation of U.S. application Ser. No. 14/813,930, filed on Jul. 30, 2015, which is a continuation-in-part of U.S. application Ser. No. 14/170,253, filed on Jan. 31, 2014. Each of these applications is hereby incorporated by reference in its entirety for all purposes.

BACKGROUND

Frequently, it is desired that a set of tasks be performed via use of one or more resources. In various instances, the tasks may need to be performed in a particular order and/or completed by a particular time. Further, configurations, specifications and characteristics of particular devices may make some tasks suitable to be performed on some devices while not on others. The reliability at which tasks are performed may be sub-optimal and inconsistent. Further, the reliability may depend on factors, such as which devices are assigned to handle the tasks.

BRIEF SUMMARY

In some embodiments, techniques are provided for generating and updating task series to facilitate reliable processing. An identifier that corresponds to an electronic device is detected. A plurality of tasks is identified that is associated with the identifier. A temporal processing constraint is detected that is applicable to the electronic device. The temporal processing constraint includes an upper-bound limit on a time for completing the plurality of tasks. A task series is generated that includes the plurality of tasks and that is consistent with the temporal processing constraint. The task series associates each task in the plurality of tasks with a performance time. A task in the plurality of tasks includes performing a processing that involves a particular electronic content object. At a time subsequent to the performance time associated with the task, it is determined that the processing involving the particular electronic content object had not been completed. The task series is updated such that the task is associated with a new performance time. The updated task series remains consistent with the temporal processing constraint. Information of the updated task series is provided.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
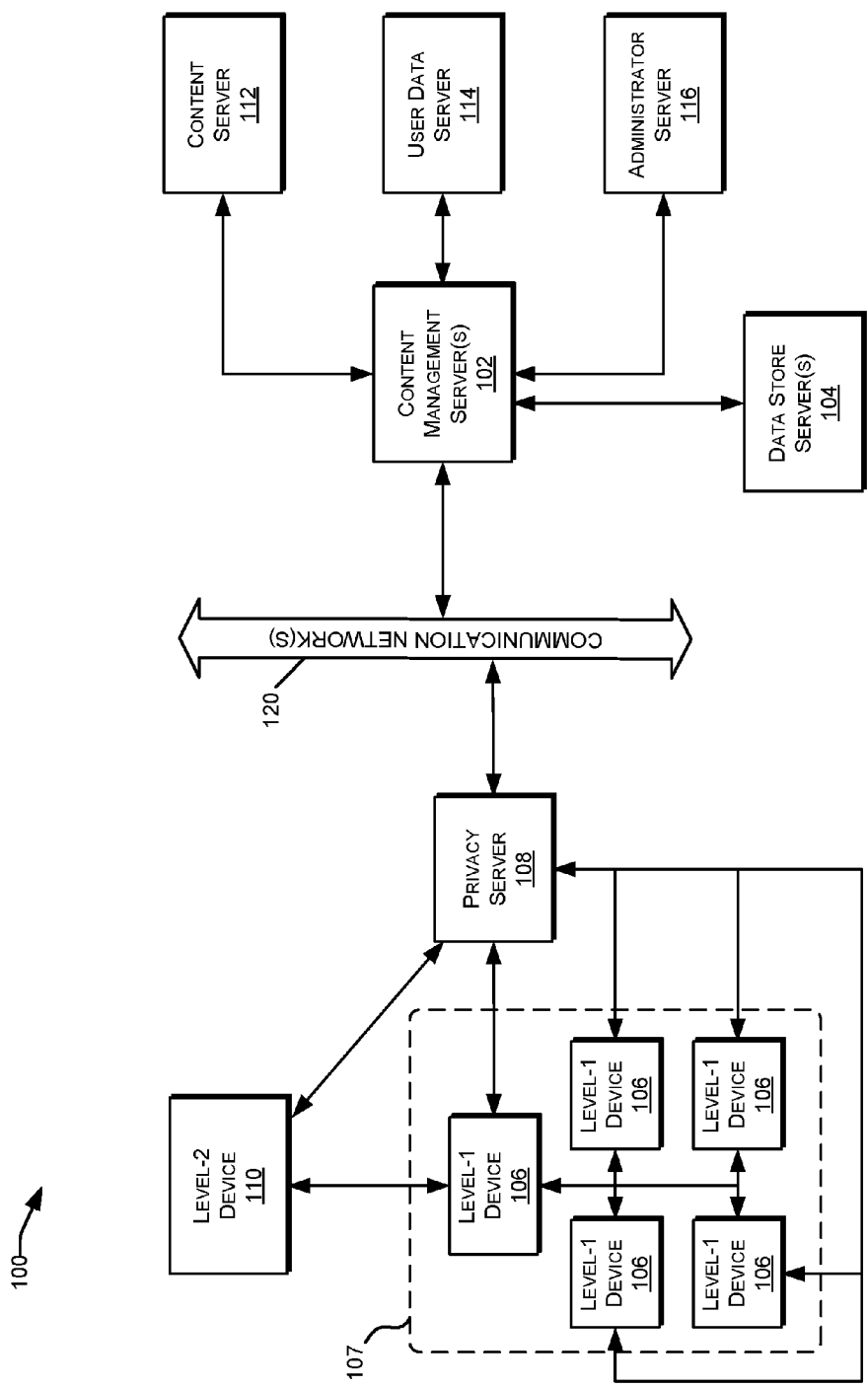
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more level-1 (e.g., user) devices 106 and/or level-2 (e.g., supervisor) devices 110. Level-1 devices 106 and level-2 devices 110 may display content received via the content distribution network 100, and may support various types of user interactions with the content. Level-1 devices 106 and level-2 devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other level-1 devices 106 and level-2 devices 110 may be general purpose personal computers or special-purpose computing devices including, by way of example, personal computers, laptop computers, workstation computers, projection devices, and interactive room display systems. Additionally, level-1 devices 106 and level-2 devices 110 may be any other electronic devices, such as a thin-client computers, an Internet-enabled gaming systems, business or home appliances, and/or a personal messaging devices, capable of communicating over network(s) 120.

In different contexts of content distribution networks 100, level-1 devices 106 and level-2 devices 110 may correspond to different types of specialized devices, for example, student devices and teacher devices, employee devices and presentation devices in a company network, different gaming devices in a gaming network, etc. In some embodiments, level-1 devices 106 and level-2 devices 110 may operate in the same physical location 107, such as a given room. In such cases, the devices may contain components that support direct communications with other nearby devices, such as a wireless transceivers and wireless communications interfaces, Ethernet sockets or other Local Area Network (LAN) interfaces, etc. In other implementations, the level-1 devices 106 and level-2 devices 110 need not be used at the same location 107, but may be used in remote geographic locations in which each level-1 device 106 and level-2 device 110 may use security features and/or specialized hardware (e.g., hardware-accelerated SSL and HTTPS, WS-Security, firewalls, etc.) to communicate with the content management server 102 and/or other remotely located level-1 devices 106. Additionally, different level-1 devices 106 and level-2 devices 110 may be assigned different designated roles, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a level-1 device 106 or level-2 device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to level-1 devices 106 and other devices in the network 100. For example, in content distribution networks 100, content server 112 may include data stores of training materials, presentations, interactive programs and simulations, course models and/or outlines, and various training interfaces that correspond to different materials and/or different types of level-1 devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their level-1 device 106, content resources accessed, and interactions with other level-1 devices 106. This data may be stored and processed by the user data server 114, to support user tracking and analysis features. For instance, the user data server 114 may store and analyze each user's training materials viewed, presentations attended, programs completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or level-1 devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein.

Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
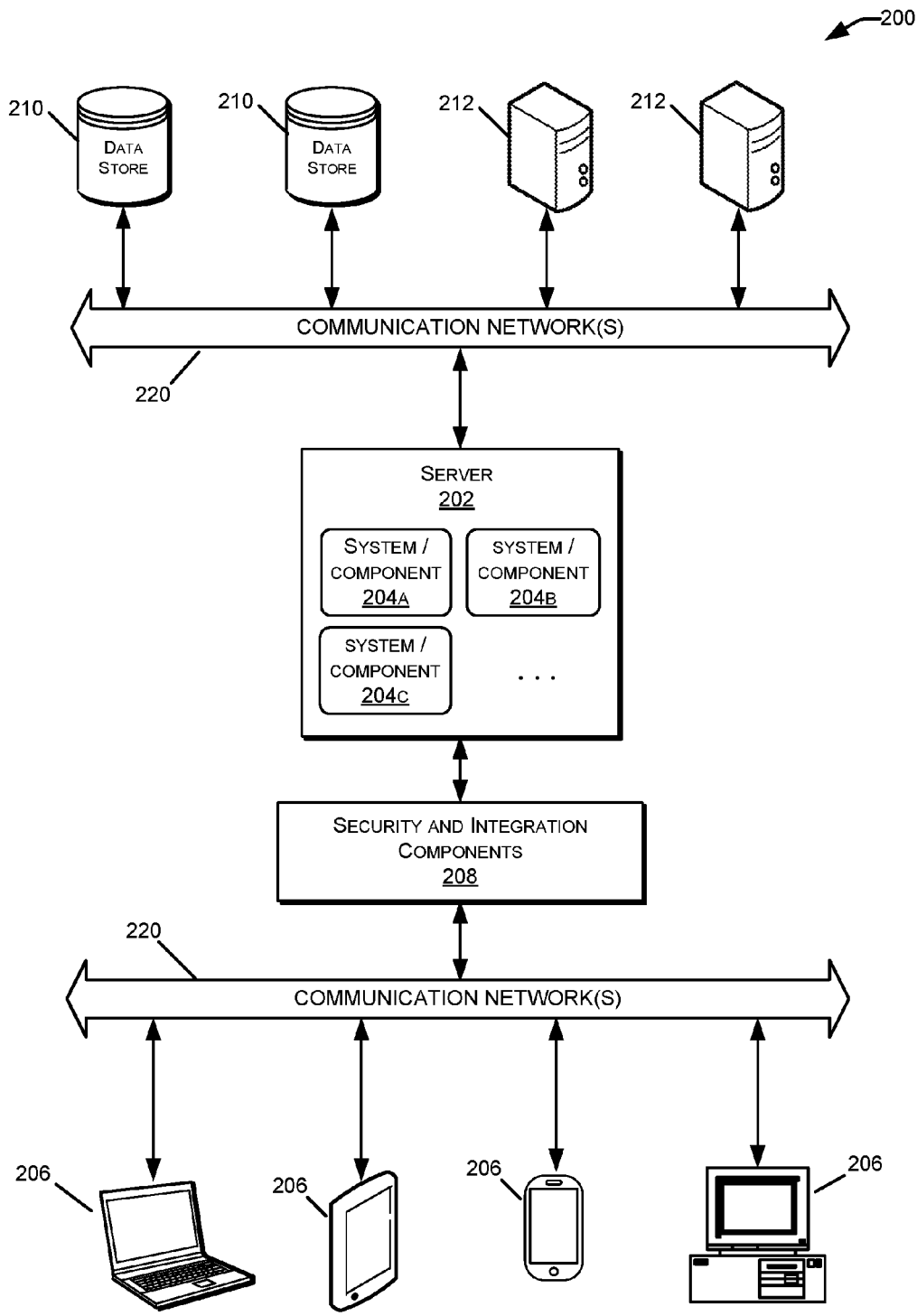
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the level-1 devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and level-1 devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and level-1 devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
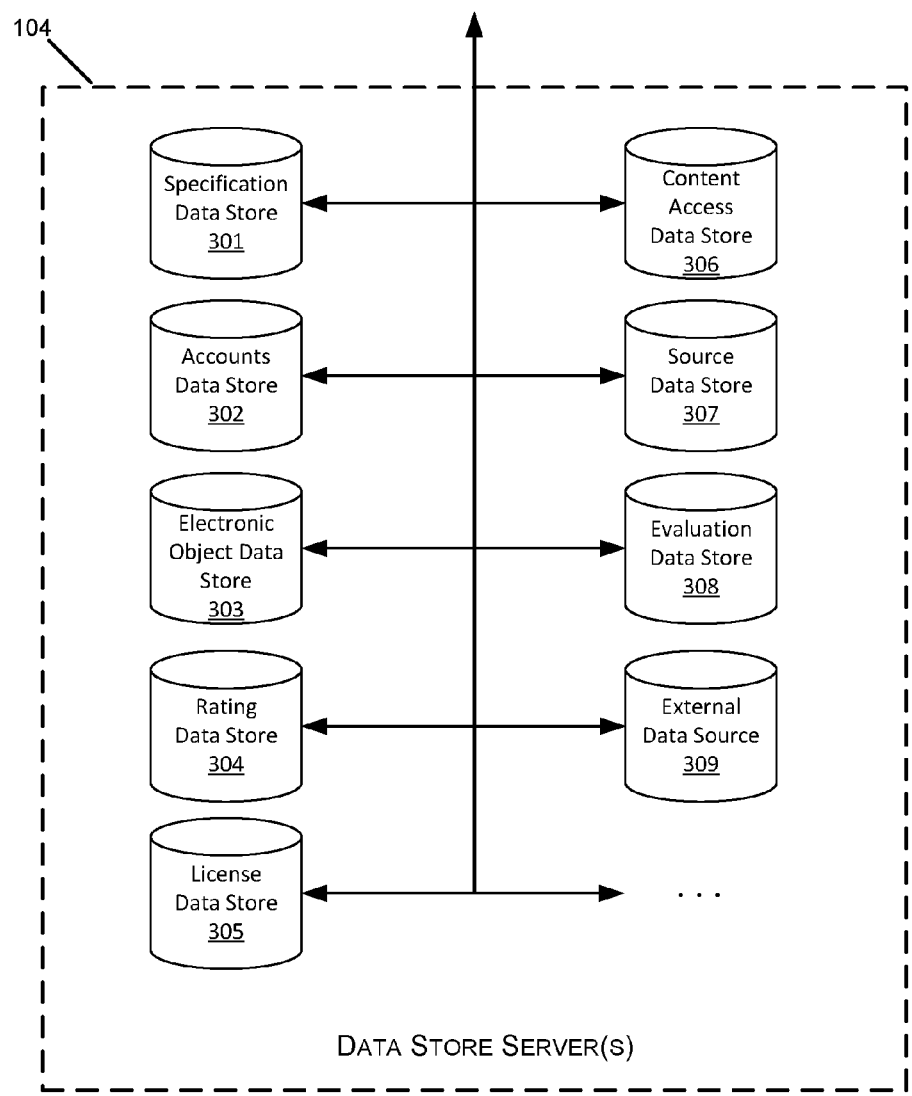
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., level-1 devices 106, level-2 devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber specifications, account data, payment data, network usage statistics, etc.

A specification data store 301 may include specifications or information relating to the end users within the content distribution network 100. This specifications may include characteristics such as the user names, access credentials (e.g., logins and passwords), and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or institutions. Account data may include account types, current account status, account characteristics, and any parameters, limits, restrictions associated with the accounts.

An electronic object data store 303 may include information describing the individual electronic content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), rate attributes of the content resources (e.g., a price and/or structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A rating data store 304 may include rating (e.g., pricing) information and/or rating structures for determining payment amounts for providing access to the content distribution network 100 and/or the individual content resources within the network 100. In some cases, rating may be determined based on a user's access to the content distribution network 100, for example, a time-based subscription fee, or rating based on network usage. In other cases, rating may be tied to specific content resources. Certain content resources may have associated rating information, whereas other rating determinations may be based on the resources accessed, the specifications and/or accounts of the user, and the desired level of access (e.g., duration of access, network speed, etc.). Additionally, the rating data store 304 may include information relating to compilation rating for groups of content resources, such as group rates and/or rate structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and level-1 devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. Data retrieved from various external data aggregators 309 may be used to verify and update user account information, suggest user content, and perform user and content evaluations.

Figure 4:
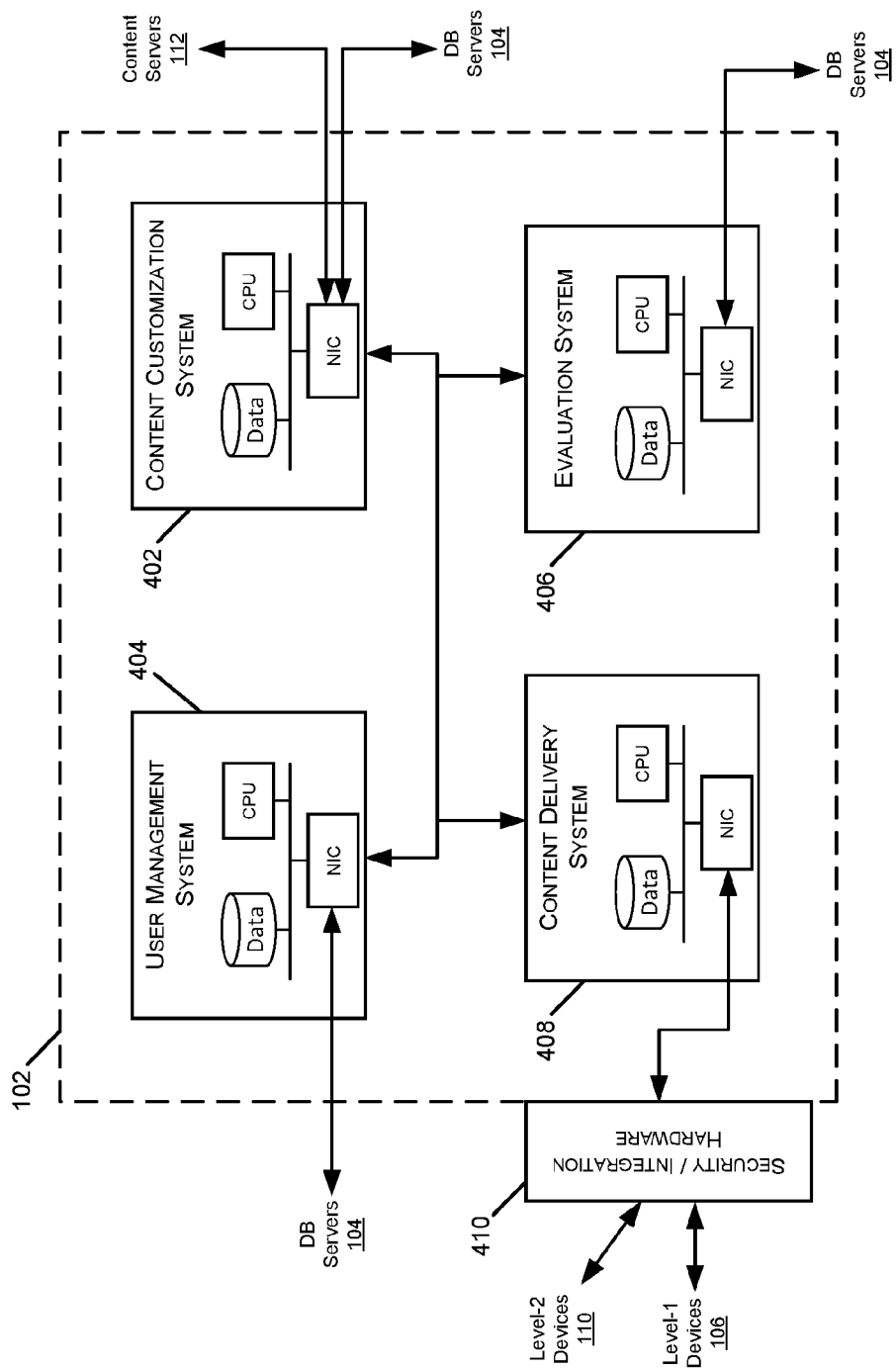
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various level-1 devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a specification data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from level-1 devices 106. For example, various ratings of content resources submitted by users may be compiled and analyzed, and then stored in a data store (e.g., a electronic object data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from level-1 devices 106, level-2 devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, comprehension levels, effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to level-1 devices 106. The content delivery system 408 may determine the appropriate presentation format for the content resources based on the user characteristics and preferences, and/or the device capabilities of level-1 devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the level-1 devices 106, level-2 devices 110, administrative servers 116, and other devices in the network 100.

Figure 5:
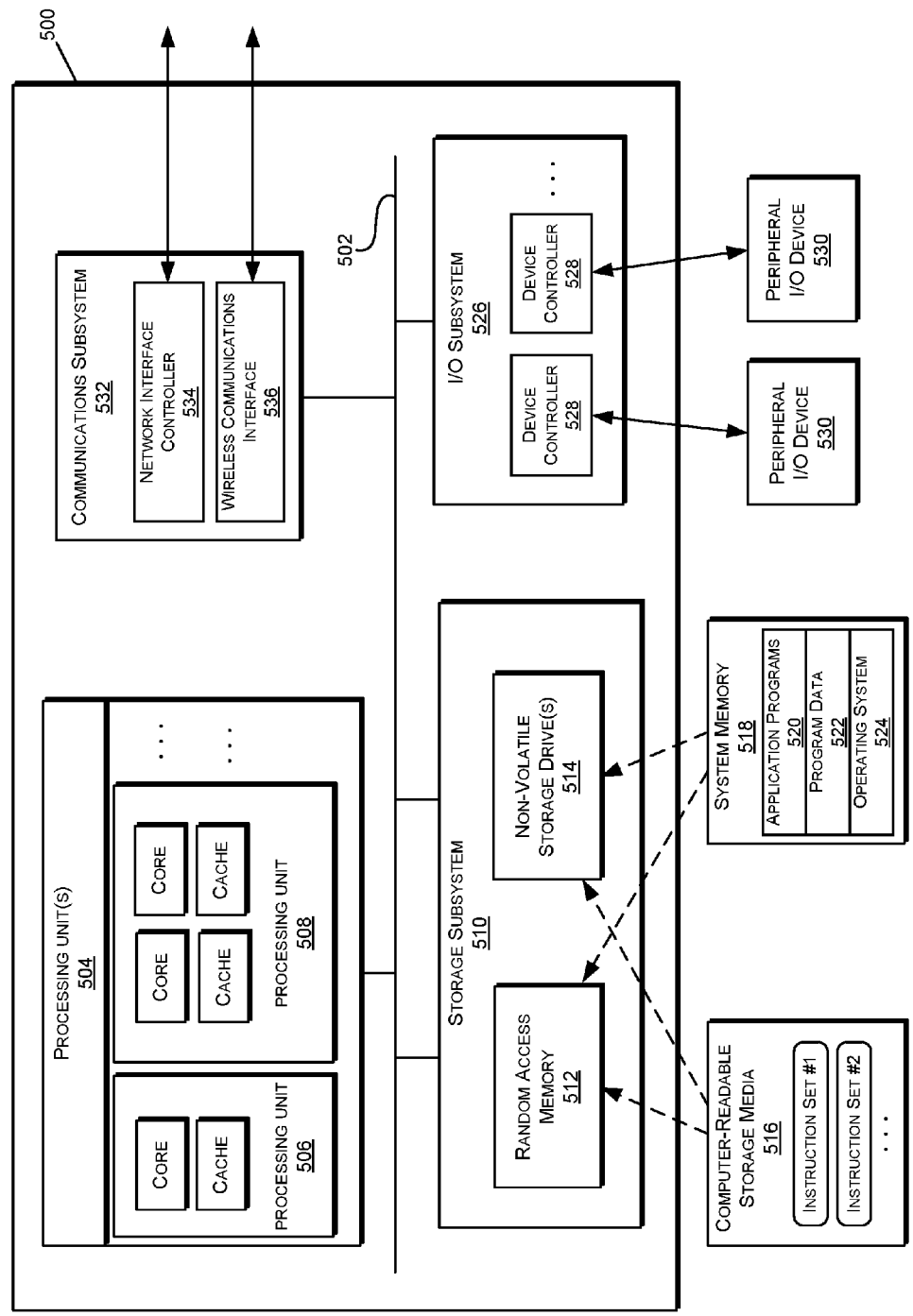
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504.

Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
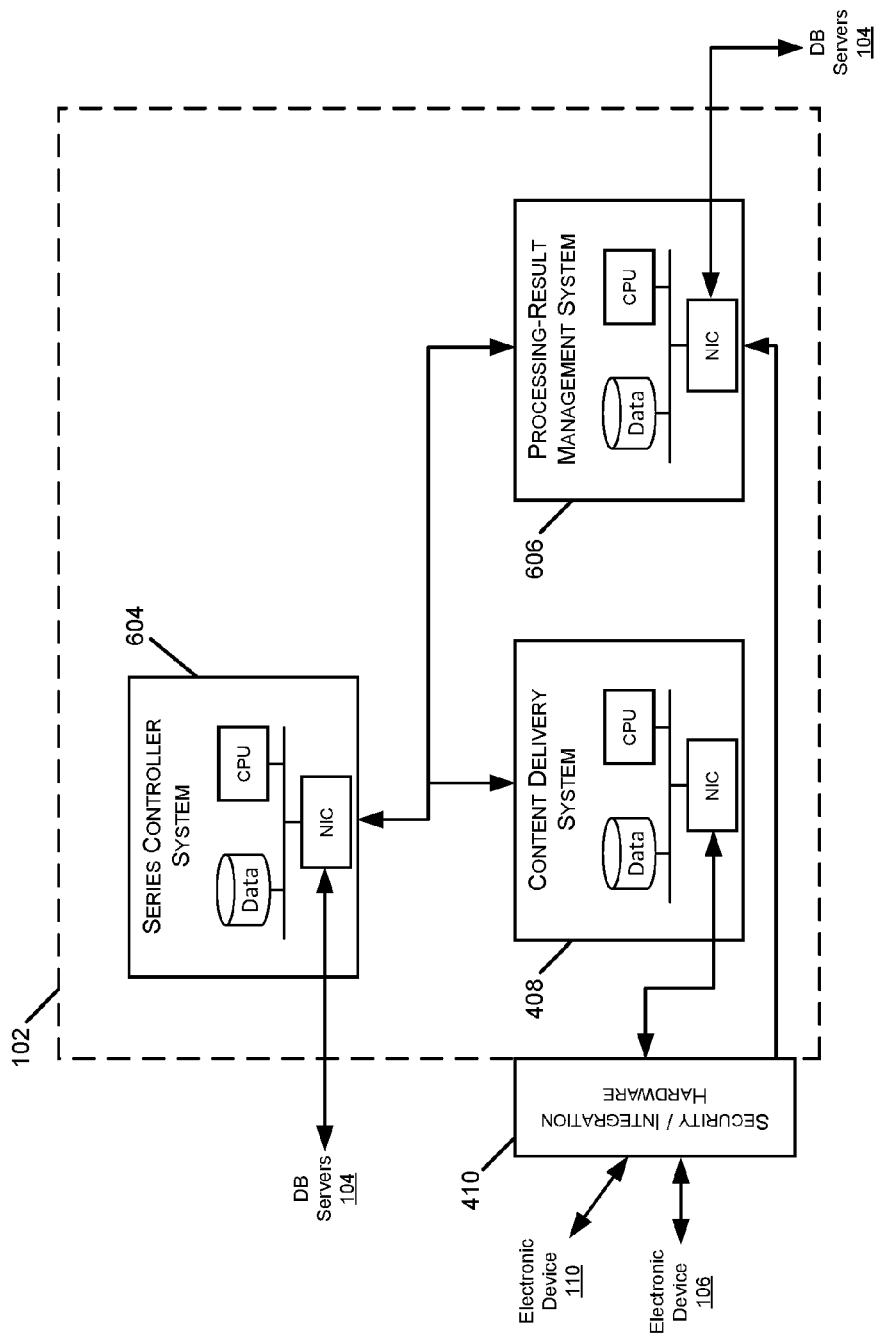
FIG. 6 is a block diagram illustrating an embodiment of one or more content management servers within a content distribution network.

FIG. 6 is a block diagram illustrating an embodiment of one or more content management servers 102 within a content distribution network. Content management server 102 includes a series controller system 604 that generates and updates individual task series that include a plurality of tasks and/or corresponds to an identified structure. In various instances, a task series can include tasks to be assigned to and/or performed by or at a single electronic device or to be assigned to and/or performed by or at multiple electronic devices. Series controller system 604 can define the task series so as to include various temporal parameters. For example, each task in the series may be associated with an initiation time, a target completion time and/or an estimated processing time period.

At least some tasks, or each task, in the series may involve an electronic content object. For example, execution of the task may include requesting and receiving the electronic content object, transforming the content object (e.g., so as to be compatible with a particular program or task-performing device), providing all or part of the content object via an interface, identifying one or more queries based on the content object, identifying one or more responses to each of the one or more queries, and so on.

In some instances, the series controller system 604, upon having defined a series, distributes or provides one or more parameters of the series to one or more devices, such as an electronic device described herein 106, 110. (Tasks and task series can also relate to details described in U.S. application Ser. No. 14/170,253, filed on Jan. 31, 2014, which is hereby incorporated by reference in its entirety for all purposes) The one or more parameters may include specifications defining individual tasks in the series, a sequence or order in which tasks are to be performed, a temporal parameter, a specification of an expected processing result, a path as to where the processing result is to be stored or transmitted to, and so on.

The series controller system 604 can monitor task performance so as to determine whether to update the task series. The monitoring can include, for example, determining whether a task has been completed prior to an identified completion time or determining whether a task had not been completed (and/or initiated) by the completion time.

In one instance, the monitoring includes communicating with content delivery system 408 to determine whether an electronic content object associated with a task had been requested or delivered to the assigned electronic time and/or to compare a delivery and/or request time to a target time defined in the task series. The content delivery system 408 may maintain an access log that stores request and/or object-transmission data in association with identifiers (e.g., of or associated with an electronic device and/or content-object identifier). The access log can then be queried with a particular identifier or identifiers to determine whether a request or provision had been made. In an alternative or additional approach to tracking object access via access-log queries, content delivery system 408 may transmit a notification to series controller system 604 upon receiving a request for an object or providing an object. The notification may include, for example, a time, an identifier of the electronic device and/or an object identifier.

Instead of or in addition to monitoring performance via content-object access, the series controller system 604 may monitor series progress by determining whether task results have been generated and stored. The processing-result management system 606 (which may include and/or include similar features to evaluation system 406) can receive processing results from task-performing devices, such as electronic devices 106 and/or 110. The results may be stored in association with, for example, an identifier of an electronic device (e.g., at which the result was identified), a time, an identifier of a content object, and/or an identifier of a task. The processing-result management system 606 may store this data (e.g., via a database server 104) and/or may alert the series controller system 604 of the detection of the result (e.g., and/or associated identifiers). The alert may be provided in response to the result detection and/or upon receiving a request from the series controller system 604.

In some instances, the series controller system 604 may determine, based on the monitoring, that one or more tasks have not been completed by a target time. The series controller system 604 may then generate an updated task series, where each of one or more tasks (e.g., each of one or more yet-unperformed tasks) are associated with a new temporal parameter. The updating may be performed such that the plurality of tasks are still to be completed by a same final series time.

In some instances, the series controller system 604 uses monitoring data so as to generate a projected temporal result. The projected temporal result can include, for example, a time at which or duration after which one or more or the plurality of tasks will be completed. The projected temporal result can be generated, for example, by comparing actual completion times with corresponding temporal parameters and extrapolating trends to predict other task-completion times.

In some instances, one or more task series are defined so as to comply with a temporal bound as to when processing of a given task or the plurality of tasks is to have been initiated and/or completed. The bound may be fixed or dynamic (e.g., so as to be configured to be adjusted in response to detecting subsequent input and/or receiving a subsequent communication that identifies a new target or limit).

Figure 7:
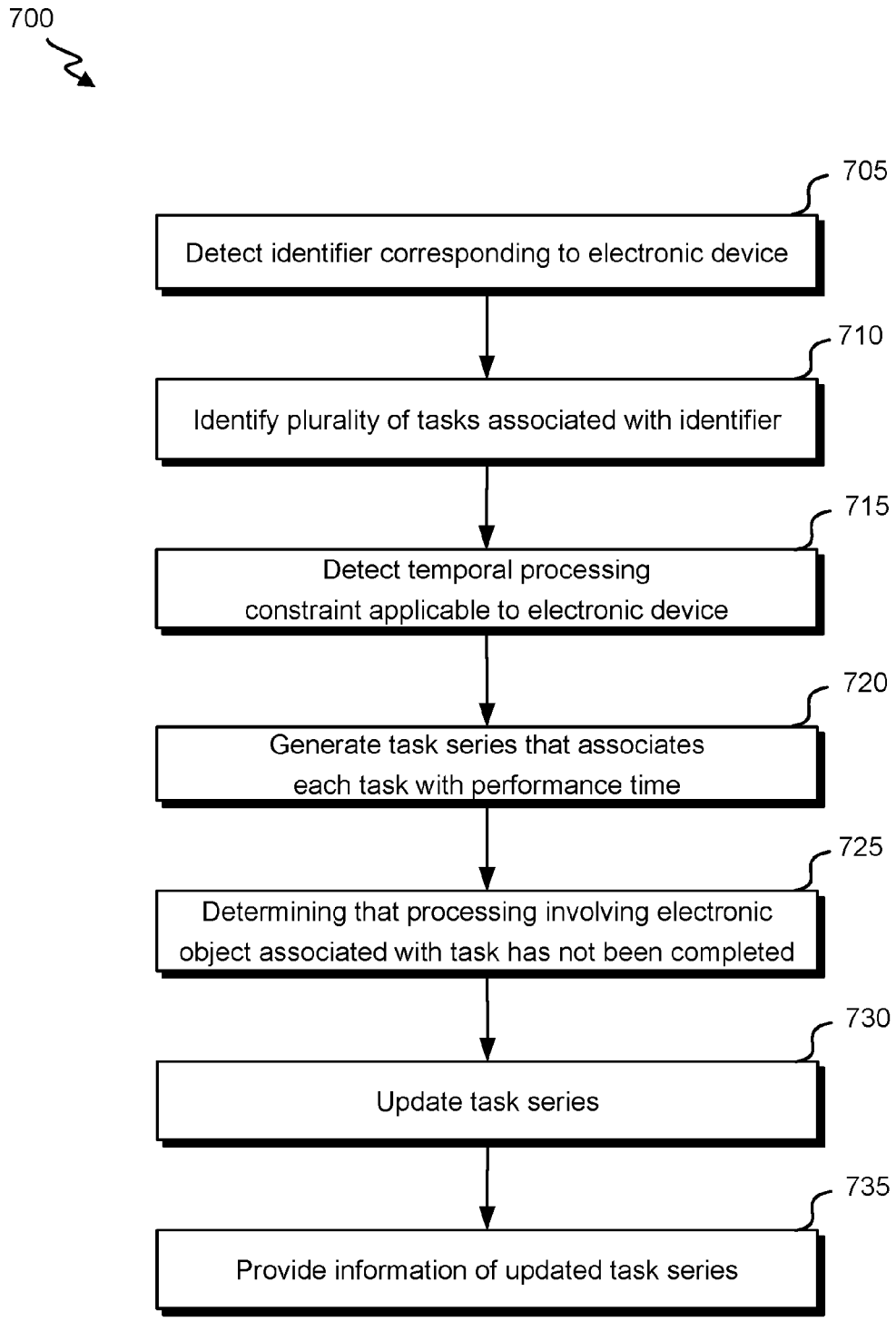
FIG. 7 is a flowchart of an embodiment of a process for generating and updating task series.

FIG. 7 is a flowchart of an embodiment of a process 700 for generating and updating task series. Process 700 can be performed (for example), in part or in its entirety, by series controller system 604. Process 700 begins at block 705 where an identifier corresponding to an electronic device is detected. The identifier can include, for example, an identifier of the device, a user associated with the device, a characteristic of a user associated with the device, or a type of the device. The identifier can be detected, for example, by extracting information corresponding to the identifier (or the identifier itself) from a communication (or metadata thereof) from the electronic device.

At block 710, a plurality of tasks associated with the identifier are identified. The plurality of tasks can include those that are pre-defined according to a structure that is associated with the identifier. In some instances, each of one, more or all of the plurality of tasks involves an electronic content object. For example, a task can include presenting an electronic content objet, receiving inputs responsive to a presentation of an electronic content object, transforming a content object (e.g., based on a specification of a level-1 device), generating a specification for an electronic content object, detecting interaction properties with an electronic content object, and so on. In some instances, each of one, more or all of the plurality of tasks involves determining one or more processing results. The one or more processing results may correspond to an electronic content object. For example, the one or more processing results may include a response to a query from a content object (e.g., the response being identified via input), a period time period during which a task involving the electronic content object was executed, a speed at which a task involving the electronic content object was executed, and so on.

At block 715, a temporal processing constraint that is applicable to the electronic device is detected. In some instances, the temporal processing constraint is one identified in or otherwise associated with a communication received from the electronic device. In some instances, the temporal processing constraint includes a default (e.g., adjustable) temporal constraint.

At block 720, a task series is generated that associates each task of the plurality of tasks with a performance time. The performance time(s) may be identified so as to be consistent with the temporal processing constraint. In one instance, the performance time for each task of the plurality of tasks is identified as being a time that is before a time as identified in the temporal processing constraint. In one instance, the performance time for each task of one, more or all tasks of the plurality of tasks is identified by interpolating times within a time period that is defined based on the processing constraint (e.g., and based on a relative or absolute processing time defined for each of one, more or all tasks in the plurality of tasks). The performance time may include an absolute or relative performance time (e.g., relative to a start of a processing of a task series).

At block 725, it is determined that processing of a task of the plurality of tasks that involves an electronic content object has not been completed. The determination at block 725 may occur at the performance time associated with the task from the time series or afterwards (e.g., a defined time period afterwards or at another time that is afterwards but triggered based on another event). In one instance, the determination may be based on a response to a query of an access log and/or processing-result data store that indicates that there is no access record or processing result that is associated with each of the identifier corresponding to the electronic device and an identifier or a task or associated electronic content object. In one instance, an access log and/or processing-result data store may include an access record or processing result that is associated with each of the identifier corresponding to the electronic device and an identifier or a task or associated electronic content object, but the access record or processing result may be associated with a time that is subsequent to the performance time.

At block 730, the task series is updated. The task series updating may include generating a new performance time for each of one or more tasks in the plurality of tasks. In one instance, the one or more tasks include each task that has not been completed and/or initiated. The one or more tasks can include the task determined not to have been completed at block 725. The new performance time for each of the one or more tasks may be determined, for example, based on a current time, an estimated task processing task and/or a time constraint. In one instance, determining the performance time for each of the one or more tasks includes generating an interpolated time for each of the one or more tasks.

At block 735, information of the updated task series is provided. The information may include information corresponding to the updated task series, the updated performance time for the one or more tasks, a temporal constraint abided to during the updating of the task series, an option to change a temporal constraint and/or an identifier of a task and/or electronic content object associated with each of the one or more tasks. In one instance, the information is configurable to be presented. The information may be provided, for example, to the electronic device.

Figure 8:
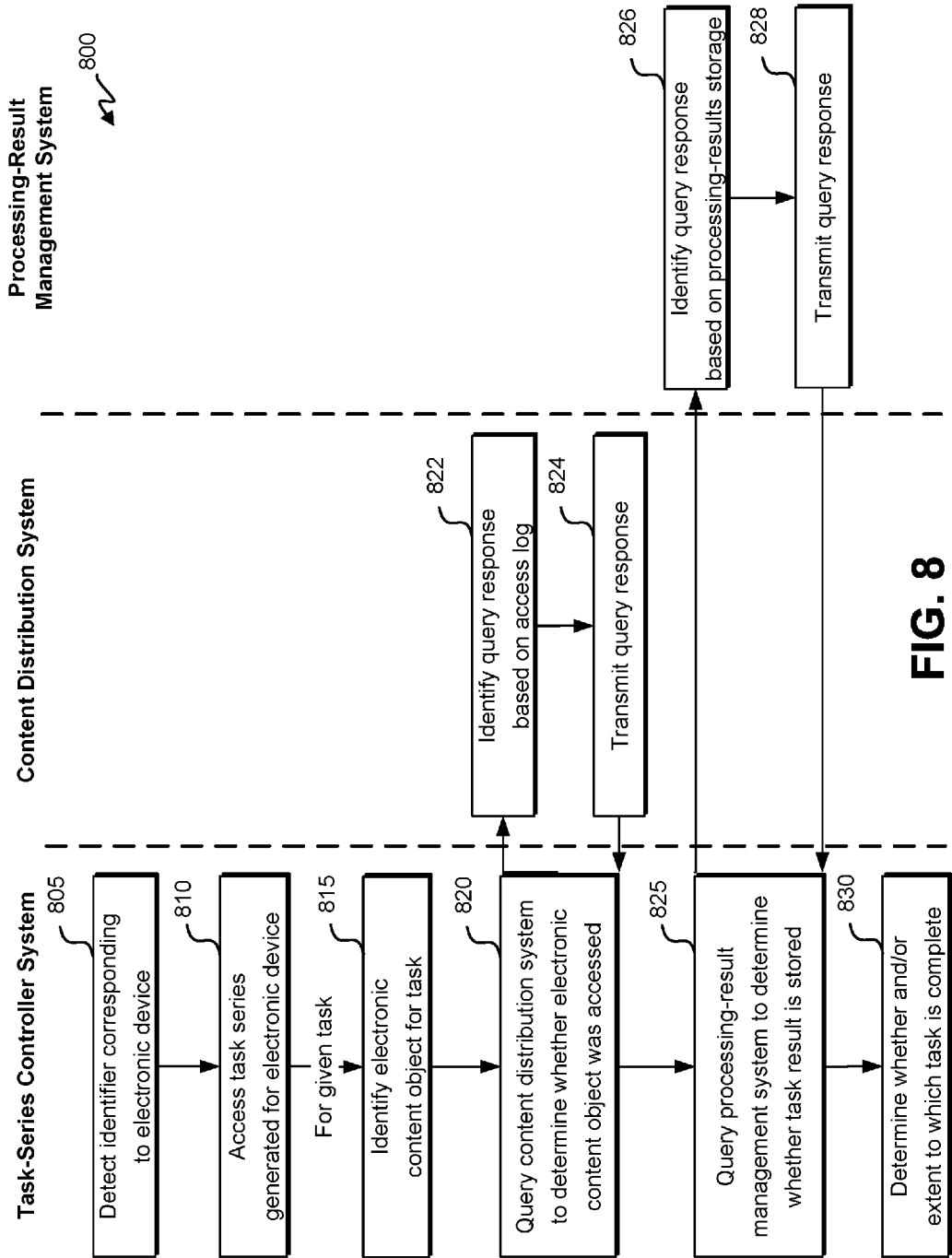
FIG. 8 is a flow diagram of an embodiment of a process for monitoring task completion.

FIG. 8 is a flow diagram of an embodiment of a process 800 for monitoring task completion. Process 800 can be performed (for example), in part or in its entirety, by series controller system 604, content delivery system 408 and process-result management system 606.

Process 800 begins at block 805, where the task-series controller system detects an identifier corresponding to an electronic device. Block 805 may parallel block 705 from process 700. At block 810, the task-series controller system accesses a task series generated for the electronic device. The task series can include one generated, for example, via block 720 from process 700. At block 815, the task-series controller system identifies, for a given task, an electronic content object associated with the task. The electronic content object can include on associated and/or involved with the task as defined, for example, based on the task series.

At block 820, the task-series controller system queries a content distribution system to determine whether the electronic content object was accessed. For example, a query communication can be generated that includes one or more of an identifier of the task series, electronic device, user, task, and/or electronic content object. The query communication can be configured so as to request, for example, whether the access log indicates that the electronic content object (e.g., that is specifically identified or associated with an identified task, task series, etc.) has been requested and/or provided (e.g., presented and/or transmitted) and/or a time at which it was requested and/or provided.

At block 822, the content distribution system identifies a query response based on data in an access log. The query response may indicate, for example, whether and/or the electronic content object was requested, accessed, presented and/or transmitted (e.g., in association with the particular electronic device and/or corresponding identifier). At block 824, the content distribution system transmits the query response to the task-series controller system.

At block 825, the task-series controller system queries a processing-result management system to determine whether a task result associated with the given task is stored. For example, a query communication can be generated that includes one or more of an identifier of the task series, electronic device, user, task, electronic content object and/or result identifier. The query communication can be configured so as to request, for example, whether a processing-results storage indicates that the processing result (e.g., that is specifically identified or associated with an identified task, task series, etc.) has been received and/or stored and/or a time at which it was received and/or stored.

At block 826, the processing-result management system identifies a query response based on data in a processing-results storage. The query response may indicate, for example, whether and/or when the task result (e.g., associated with the particular electronic device and/or corresponding identifier) was received and/or stored. In some instances, the query response includes the task result itself (e.g., along with other data). At block 828, the processing-result management system transmits the query response to the task-series controller system.

At block 830, the task-series controller system determines whether and/or an extent to which the given task is completed. The determination can be based on the results received responsive to the query from block 820 and/or from block 825. In one instance, block 830 may further or alternatively include determining when the task had been completed. In some instances, some or all of process 800 is included in block 725 of process 725 to determine that the processing associated with the task had not been completed.

Embodiments disclosed herein provide a variety of technical advantages responsive to various technical problems. For example, processing and task-performance reliability can be improved via monitoring of electronic content object access and generation of processing results. The reliability can further be improved by dynamically managing and automatically updating a task series based on monitoring data.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for generating task series and monitoring processing of content objects, the system comprising:
   one or more data processors; and
   a non-transitory computer readable storage medium containing instructions which when executed on the one or more data processors, cause the one or more data processors to perform actions including:
      detecting an identifier that corresponds to an electronic device, the identifier being associated with an educational course;
      identifying a plurality of tasks associated with the identifier;
      detecting a temporal processing constraint that is applicable to the electronic device that includes an upper-bound limit on a time for completing the plurality of tasks;
      generating a task series that includes the plurality of tasks and that is consistent with the temporal processing constraint, the task series associating each task in the plurality of tasks with a performance time, wherein a task in the plurality of tasks includes performing a processing that involves a particular electronic content object, and wherein the processing that involves the particular electronic content object includes provision of user input at the electronic device;
      generating a presentation that identifies a performance time of at least one task in the plurality of tasks;
      determining, at a time subsequent to the performance time associated with the task, that the processing involving the particular electronic content object had not been completed with respect to a user, wherein determining that the processing involving the particular electronic content object had not been completed includes determining that a data store does not include a set of processing results associated with the identifier; and
      in response to determination, availing a notification to a device associated with the user.

2. The system for generating task series and monitoring processing of content objects as recited in claim 1, wherein the actions further include:
   generating a variable corresponding to a projected time for completing the plurality of tasks, wherein the notification includes the variable.

3. The system for generating task series and monitoring processing of content objects as recited in claim 1, wherein determining that the data store does not include the set of processing results associated with the identifier includes:
   detecting one or more processing results associated with the identifier and the at least one task;

determining a score for the one or more processing results; and determining that the score is below a defined threshold.

4. The system for generating task series and monitoring processing of content objects as recited in claim 1, wherein the actions further include:

identifying a second identifier that corresponds to a second electronic device, the second identifier being associated with a second educational course;

identifying that the plurality of tasks are associated with the second identifier;

identifying a second temporal processing constraint that applies to the second electronic device that includes a second upper-bound limit on a time for completing the plurality of tasks; and generating a second task series that includes the plurality of tasks and that is consistent with the second temporal processing constraint, the second task series associating each task in the plurality of tasks with a second performance time different that the performance time associated with the task in the task series.

5. The system for generating task series and monitoring processing of content objects as recited in claim 1, wherein the actions further include:

receiving, prior to the detection of the temporal processing constraint, a communication from the electronic device that identifies the temporal processing constraint.

6. The system for generating task series and monitoring processing of content objects as recited in claim 1, wherein the actions further include:

detecting a new temporal processing constraint that applies to the electronic device that includes a new upper-bound limit on the time for completing the plurality of tasks;

updating the task series so as to be consistent with the new temporal processing constraint; and generating another presentation that identifies an updated performance time identified in the updated task series.

7. The system for generating task series and monitoring processing of content objects as recited in claim 1, wherein another task in the plurality of tasks includes performing a processing that involves another particular electronic content object, and wherein the actions further include:

determining, at another time subsequent to the performance time associated with the task, that the processing involving the other particular electronic content object had not been completed; and availing another notification to the device associated with the user.

8. The system for generating task series and monitoring processing of content objects as recited in claim 7, wherein determining that the processing involving the other particular electronic content object had not been completed includes determining that the other electronic content object has not at least one of:

requested by the electronic device;

accessed by the electronic device; or transmitted to the electronic device.

9. A computer-implemented method for generating task series and monitoring processing of content objects the method comprising:

detecting an identifier that corresponds to an electronic device, the identifier being associated with an educational course;

identifying a plurality of tasks associated with the identifier;

detecting a temporal processing constraint that is applicable to the electronic device that includes an upper-bound limit on a time for completing the plurality of tasks;

generating a task series that includes the plurality of tasks and that is consistent with the temporal processing constraint, the task series associating each task in the plurality of tasks with a performance time, wherein a task in the plurality of tasks includes performing a processing that involves a particular electronic content object, and wherein the processing that involves the particular electronic content object includes provision of user input at the electronic device;

generating a presentation that identifies a performance time of at least one task in the plurality of tasks;

determining, at a time subsequent to the performance time associated with the task, that the processing involving the particular electronic content object had not been completed with respect to a user, wherein determining that the processing involving the particular electronic content object had not been completed includes determining that a data store does not include a set of processing results associated with the identifier; and in response to determination, availing a notification to a device associated with the user.

10. The computer-implemented method for generating task series and monitoring processing of content objects as recited in claim 9, further comprising:

generating a variable corresponding to a projected time for completing the plurality of tasks, wherein the notification includes the variable.

11. The computer-implemented method for generating task series and monitoring processing of content objects as recited in claim 9, wherein determining that the data store does not include the set of processing results associated with the identifier includes:

detecting one or more processing results associated with the identifier and the at least one task;

determining a score for the one or more processing results; and determining that the score is below a defined threshold.

12. The computer-implemented method for generating task series and monitoring processing of content objects as recited in claim 9, further comprising:

identifying a second identifier that corresponds to a second electronic device, the second identifier being associated with a second educational course;

identifying that the plurality of tasks are associated with the second identifier;

identifying a second temporal processing constraint that applies to the second electronic device that includes a second upper-bound limit on a time for completing the plurality of tasks; and generating a second task series that includes the plurality of tasks and that is consistent with the second temporal processing constraint, the second task series associating each task in the plurality of tasks with a second performance time different that the performance time associated with the task in the task series.

13. The computer-implemented method for generating task series and monitoring processing of content objects as recited in claim 9, further comprising:

receiving, prior to the detection of the temporal processing constraint, a communication from the electronic device that identifies the temporal processing constraint.

14. The computer-implemented method for generating task series and monitoring processing of content objects as recited in claim 9, further comprising:
- detecting a new temporal processing constraint that applies to the electronic device that includes a new upper-bound limit on the time for completing the plurality of tasks;
- updating the task series so as to be consistent with the new temporal processing constraint; and
- generating another presentation that identifies an updated performance time identified in the updated task series.

15. The computer-implemented method for generating task series and monitoring processing of content objects as recited in claim 9, wherein another task in the plurality of tasks includes performing a processing that involves another particular electronic content object, and wherein the method further comprises:
- determining, at another time subsequent to the performance time associated with the task, that the processing involving the other particular electronic content object had not been completed; and
- availing another notification to the device associated with the user.

16. The computer-implemented method for generating task series and monitoring processing of content objects as recited in claim 15, wherein determining that the processing involving the other particular electronic content object had not been completed includes determining that the other electronic content object has not at least one of:
- requested by the electronic device;
- accessed by the electronic device; or
- transmitted to the electronic device.

17. A computer-program product tangibly embodied in a non-transitory machine-readable storage medium, including instructions configured to cause one or more data processors to perform actions including:
- detecting an identifier that corresponds to an electronic device, the identifier being associated with an educational course;
- identifying a plurality of tasks associated with the identifier;
- detecting a temporal processing constraint that is applicable to the electronic device that includes an upper-bound limit on a time for completing the plurality of tasks;
- generating a task series that includes the plurality of tasks and that is consistent with the temporal processing constraint, the task series associating each task in the plurality of tasks with a performance time, wherein a task in the plurality of tasks includes performing a processing that involves a particular electronic content object, and wherein the processing that involves the particular electronic content object includes provision of user input at the electronic device;
- generating a presentation that identifies a performance time of at least one task in the plurality of tasks;
- determining, at a time subsequent to the performance time associated with the task, that the processing involving the particular electronic content object had not been completed with respect to a user, wherein determining that the processing involving the particular electronic content object had not been completed includes determining that a data store does not include a set of processing results associated with the identifier; and
- in response to determination, availing a notification to a device associated with the user.

18. The computer-program product as recited in claim 17, wherein the actions further include:
- generating a variable corresponding to a projected time for completing the plurality of tasks, wherein the notification includes the variable.

19. The computer-program product as recited in claim 17, wherein determining that the data store does not include the set of processing results associated with the identifier includes:
- detecting one or more processing results associated with the identifier and the at least one task;
- determining a score for the one or more processing results; and
- determining that the score is below a defined threshold.

20. The computer-program product as recited in claim 17, wherein the actions further include:
- identifying a second identifier that corresponds to a second electronic device, the second identifier being associated with a second educational course;
- identifying that the plurality of tasks are associated with the second identifier;
- identifying a second temporal processing constraint that applies to the second electronic device that includes a second upper-bound limit on a time for completing the plurality of tasks; and
- generating a second task series that includes the plurality of tasks and that is consistent with the second temporal processing constraint, the second task series associating each task in the plurality of tasks with a second performance time different that the performance time associated with the task in the task series.

* * * * *